(12) United States Patent
Bai et al.

(10) Patent No.: US 8,213,548 B2
(45) Date of Patent: Jul. 3, 2012

(54) METHODS AND APPARATUS FOR DYNAMIC PACKET REORDERING

(75) Inventors: Jinxia Bai, San Diego, CA (US);
Chinnappa K. Ganapathy, San Diego, CA (US); Thomas Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1003 days.

(21) Appl. No.: 11/398,205

(22) Filed: Apr. 4, 2006

(65) Prior Publication Data

US 2007/0230632 A1 Oct. 4, 2007

(51) Int. Cl.
*H04L 27/28* (2006.01)
*H04L 27/00* (2006.01)
*H04L 27/06* (2006.01)
*H04K 1/10* (2006.01)

(52) U.S. Cl. .................. 375/340; 375/260; 375/316
(58) Field of Classification Search .................. 375/260, 375/316, 340, 341, 262; 370/321, 326, 345, 370/347, 498, 336
See application file for complete search history.

(56) References Cited

U.S. PATENT DOCUMENTS

| | | | |
|---|---|---|---|
| 5,870,628 A | 2/1999 | Chen et al. |
| 5,917,812 A | 6/1999 | Antonio et al. |
| 6,067,330 A | 5/2000 | Usui |
| 6,252,917 B1 | 6/2001 | Freeman |
| 6,381,728 B1 | 4/2002 | Kang |
| 6,624,767 B1 | 9/2003 | Shiu et al. |
| 6,668,350 B1 | 12/2003 | Kim |
| 6,728,803 B1 | 4/2004 | Nelson et al. |
| 6,754,217 B1 | 6/2004 | Ahn |
| 6,763,028 B2 | 7/2004 | Fujii |
| 6,781,992 B1 | 8/2004 | Rana et al. |
| 6,788,652 B1 | 9/2004 | Hwang |
| 7,075,936 B2 | 7/2006 | Hathaway et al. |
| 7,171,110 B1 | 1/2007 | Wilshire |
| 7,177,279 B2 | 2/2007 | Kataria |
| 7,254,112 B2 | 8/2007 | Cornet et al. |

(Continued)

FOREIGN PATENT DOCUMENTS

CN 1523769 A 8/2004

(Continued)

OTHER PUBLICATIONS

International Search Report—PCT/US07/065904, International Search Authority—European Patent Office—Sep. 21, 2007.

(Continued)

*Primary Examiner* — Betsy L Deppe
(74) *Attorney, Agent, or Firm* — Ryan N. Farr

(57) ABSTRACT

Methods and apparatus for dynamic packet reordering. In an aspect, a method is provided for processing slot data on-the-fly to produce decodable packets, wherein the slot data includes interleaved modulation symbols. The method includes de-interleaving a stream of the interleaved modulation symbols to produce a stream of modulation symbols, calculating parallel streams of LLR metrics based on the stream of modulation symbols, and mapping the parallel streams of LLR metrics to produce a stream of decodable packets. In another aspect, an apparatus is provided the includes de-interleaving logic to de-interleave a stream of interleaved modulation symbols to produce a stream of modulation symbols, metric processing logic configured to produce parallel streams of LLR metrics based on the stream of modulation symbols, and mapping logic configured to map the parallel streams of LLR metrics to produce a stream of decodable packets.

58 Claims, 8 Drawing Sheets

U.S. PATENT DOCUMENTS

| | | |
|---|---|---|
| 7,302,620 B2 | 11/2007 | Kim |
| 7,349,462 B2 | 3/2008 | Schott et al. |
| 7,386,057 B2 | 6/2008 | Ito et al. |
| 7,409,606 B2 | 8/2008 | Nakai |
| 7,433,946 B2 | 10/2008 | Shen et al. |
| 7,464,316 B2 | 12/2008 | Bickerstaff et al. |
| 7,555,071 B2 * | 6/2009 | Sontowski .................. 375/341 |
| 7,653,153 B2 | 1/2010 | Tosato et al. |
| 7,724,838 B2 | 5/2010 | Mantravadi |
| 2002/0015425 A1 | 2/2002 | Fujii |
| 2003/0041218 A1 | 2/2003 | Kataria |
| 2003/0137936 A1 | 7/2003 | Cornet et al. |
| 2004/0091058 A1 * | 5/2004 | Tosato et al. ............... 375/261 |
| 2004/0117716 A1 | 6/2004 | Shen |
| 2004/0161046 A1 | 8/2004 | Schott et al. |
| 2004/0165675 A1 * | 8/2004 | Ito et al. .................. 375/267 |
| 2004/0248002 A1 | 12/2004 | Asahina et al. |
| 2005/0052991 A1 * | 3/2005 | Kadous ..................... 370/216 |
| 2005/0068918 A1 | 3/2005 | Mantravadi et al. |
| 2005/0117891 A1 | 6/2005 | Suzuki |
| 2005/0190864 A1 | 9/2005 | Pan et al. |
| 2005/0283705 A1 * | 12/2005 | McNamara ................. 714/755 |
| 2006/0045169 A1 * | 3/2006 | Kim ........................... 375/260 |
| 2006/0156163 A1 | 7/2006 | Berens et al. |
| 2006/0193290 A1 | 8/2006 | Suzuki et al. |
| 2006/0198454 A1 * | 9/2006 | Chung et al. .............. 375/260 |
| 2007/0050694 A1 | 3/2007 | Bickerstaff et al. |
| 2007/0110065 A1 | 5/2007 | Rodgers et al. |
| 2007/0248002 A1 | 10/2007 | Kim et al. |
| 2007/0271492 A1 | 11/2007 | Yahata et al. |
| 2008/0195913 A1 | 8/2008 | Bates et al. |

FOREIGN PATENT DOCUMENTS

| | | |
|---|---|---|
| CN | 1627416(A) | 6/2005 |
| EP | 1511318 | 3/2005 |
| EP | 1267511 | 1/2008 |
| GB | 2388760 | 11/2003 |
| JP | 10051495 A | 2/1998 |
| JP | 11298437 A | 10/1999 |
| JP | 2002052770 A | 2/2002 |
| JP | 2005167420 A | 6/2005 |
| JP | 2005323173 A | 11/2005 |
| TW | I234949 | 6/2005 |
| TW | I234950 | 6/2005 |
| TW | I235560 | 7/2005 |
| WO | WO 2006/019102 A1 | 2/2006 |
| WO | WO2006020123 A2 | 2/2006 |

OTHER PUBLICATIONS

Written Opinion—PCT/US07/065904, International Search Authority—European Patent Office—Sep. 21, 2007.

International Search Report—PCT/US2007/065985, International Searching Authority—European Patent Office, Sep. 25, 2007.

Written Opinion—PCT/US2007/065985, International Searching Authority—European Patent Office, Sep. 25, 2007.

Chi, Yuan, et al., "A Novel Burst Assembly Algorithm for OBS Networks—Based on Data-Length Time-Lag Product," Asia-Pacific Conference on Communications, Oct. 2005, pp. 319-323, IEEE, Perth, Western Australia.

Search Report, ROC (Taiwan) Patent Application No. 096112151 (Translation), Jul. 21, 2010, TIPO, Taiwan.

* cited by examiner

| Mode | Meaning | Turbo packet length | Slot per turbo packet | Buffer memory address reset value | Slot read start point |
|---|---|---|---|---|---|
| 0 | QPSK, rate 1/3 | 3000 | 3 | 0, 1000, 2000 | 0 |
| 1 | QPSK, rate 1/2 | 2000 | 2 | 0, 1000 | 0 |
| 2 | 16-QAM, rate 1/3 | 3000 | 1.5 | 0, 1000, 2000 | 0, 2/4 |
| 3 | 16-QAM, rate 1/2 | 2000 | 1 | 0 | 0 |
| 4 | 16-QAM, rate 2/3 | 1500 | 0.75 | 0, 500, 1000 | 0, 1/4, 2/4, 3/4 |
| 5 | OIS QPSK, rate 1/5 | 5000 | 5 | 0, 1000, 2000, 3000, 4000 | 0 |
| 6 | L-QPSK, rate 1/3, ratio--4 | 3000 | 3 | 0, 1000, 2000 | 0 |
| 7 | L-QPSK, rate ½, ratio--4 | 2000 | 2 | 0, 1000 | 0 |
| 8 | L-QPSK, rate 2/3, ratio--4 | 1500 | 1.5 | 0, 500, 1000 | 0, 2/4 |
| 9 | L-QPSK, rate 1/3, ratio-6.25 | 3000 | 3 | 0, 1000, 2000 | 0 |
| 10 | L-QPSK, rate ½, ratio-6.25 | 2000 | 2 | 0, 1000 | 0 |
| 11 | L-QPSK, rate 2/3, ratio-6.25 | 1500 | 1.5 | 0, 1000, 2000 | 0, 2/4 |

METHODS AND APPARATUS FOR DYNAMIC PACKET REORDERING

CROSS REFERENCE TO RELATED APPLICATIONS

The present Application for patent is related to co-pending U.S. patent application, entitled: "METHODS AND APPARATUS FOR DYNAMIC PACKET MAPPING" by same inventors, having U.S. patent application Ser. No. 11/398, 156, filed Apr. 4, 2006, assigned to the assignee hereof, and expressly incorporated by reference herein.

BACKGROUND

1. Field

The present application relates generally to the distribution of data over a data network, and more particularly, to methods and apparatus for dynamic packet reordering.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered over a distribution network.

Typically, data representing one or more services is rate adjusted and processed using one or more error correction techniques. For example, the data may be turbo encoded, bit interleaved, and then divided to slots that are bit scrambled. Additionally, constellation mapping and symbol interleaving may be performed. Finally, the data may be mapped into interlaces to form an OFDM symbol.

At a receiving device, the above processes need to be reversed in order to obtain data packets that can be decoded to recover the transmitted services. Unfortunately, conventional systems may reverse the above processes in a step by step manner utilizing intermediate memories. This not only increases the size and cost of the receiving logic, but introduces processing latencies. For example, if all of the above processes are reversed step by step, intermediate memories will be needed between steps and significant processing latencies will occur.

Therefore what is needed is a system to process data in a received transmission frame so that the processes used to encode the data can be reversed, while the amount of intermediate memories are reduced or eliminated thereby minimizing processing latencies.

SUMMARY

In one or more embodiments, a reordering system, comprising methods and apparatus, is provided that operates to provide dynamic packet reordering. For example, in one aspect, the system operates "on-the-fly" and using parallel processing to reorder received modulation symbols into decodable packets that can be used to recover services transmitted over a distribution network. Since the system operates on-the-fly using parallel processing, intermediate memories are reduced or eliminated thereby minimizing processing latencies.

In an aspect, a method is provided for processing slot data on-the-fly to produce decodable packets, wherein the slot data comprises interleaved modulation symbols. The method comprises de-interleaving a stream of the interleaved modulation symbols to produce a stream of modulation symbols, calculating parallel streams of LLR metrics based on the stream of modulation symbols, and mapping the parallel streams of LLR metrics to produce a stream of decodable packets.

In another aspect, an apparatus is provided for processing slot data on-the-fly to produce decodable packets, wherein the slot data comprises interleaved modulation symbols. The apparatus comprises de-interleaving logic configured to de-interleave a stream of the interleaved modulation symbols to produce a stream of modulation symbols. The apparatus also comprises metric processing logic configured to produce parallel streams of LLR metrics based on the stream of modulation symbols, and mapping logic configured to map the parallel streams of LLR metrics to produce a stream of decodable packets.

In another aspect, an apparatus is provided for processing slot data on-the-fly to produce decodable packets, wherein the slot data comprises interleaved modulation symbols. The apparatus comprises means for de-interleaving a stream of the interleaved modulation symbols to produce a stream of modulation symbols. The apparatus also comprises means for calculating parallel streams of LLR metrics based on the stream of modulation symbols, and means for mapping the parallel streams of LLR metrics to produce a stream of decodable packets.

In another aspect, a computer-readable medium is provided that comprises a computer program, which when executed by at least one processor, operates to process slot data on-the-fly to produce decodable packets, wherein the slot data comprises interleaved modulation symbols. The computer program comprises instructions for de-interleaving a stream of the interleaved modulation symbols to produce a stream of modulation symbols. The computer program also comprises instructions for calculating parallel streams of LLR metrics based on the stream of modulation symbols, and instructions for mapping the parallel streams of LLR metrics to produce a stream of decodable packets.

In still another aspect, at least one processor is provided that is configured to perform a method for processing slot data on-the-fly to produce decodable packets, wherein the slot data comprises interleaved modulation symbols. The method comprises de-interleaving a stream of the interleaved modulation symbols to produce a stream of modulation symbols, calculating parallel streams of LLR metrics based on the stream of modulation symbols, and mapping the parallel streams of LLR metrics to produce a stream of decodable packets.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein:

FIG. 2 shows an embodiment of a frame that illustrates OFDM slots and slot allocation for a logical channel for use in a reordering system;

DESCRIPTION

In one or more embodiments, a reordering system is provided that operates to provide dynamic on-the-fly reordering of data received in a transmission frame. For example, the transmission frame comprises multiplexed content flows having a particular arrangement, sequence, mixing, interleaving, scrambling, and/or other encoding of real-time and/or other than real-time services. The system operates to dynamically reorder the received data on-the-fly using parallel processing to produce packets that can be decoded to obtain the transmitted services. Thus, the need for intermediate memories is reduced or eliminated and processing latencies are minimized. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

For the purpose of this description, embodiments of a reordering system are described herein with reference to a communication network that utilizes Orthogonal Frequency Division Multiplexing (OFDM) to provide communications between a network server and one or more mobile devices. For example, in an embodiment of an OFDM system, a frame is defined that comprises time division multiplex (TDM) pilot signals, frequency division multiplex (FDM) pilot signals, overhead information symbols (OIS), and data symbols. The data symbols are used to transport services from the server to receiving devices. A data slot is defined as a set of 500 data symbols that occur over one OFDM symbol time. Additionally, an OFDM symbol time in the frame carries seven slots of data.

The following definitions are used herein to describe one or more embodiments of a multiplexer system.

Flow An element of a service, for example, a service may have two flows—an audio flow and a video flow.

Service A media content that can have one or more flows.

MLC A media logical channel ("channel") used for data or control information.

Overhead Information Symbols (OIS)

Symbols in a frame that carry information about the location of various MLCs in the frame.

Slot The smallest unit of bandwidth allocated to a MLC over an OFDM symbol.

Figure 1:
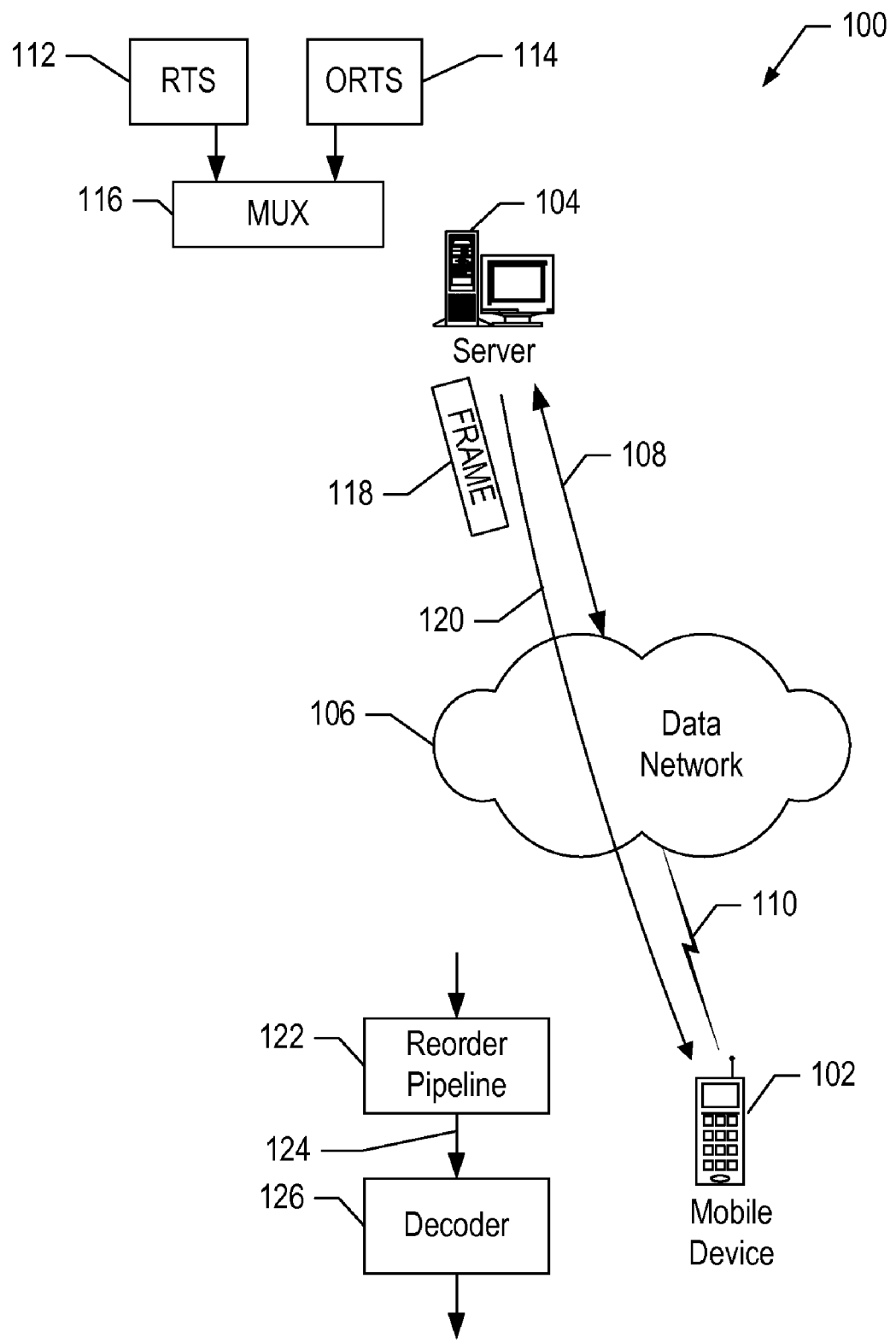
FIG. 1 shows a network that comprises an embodiment of a reordering system.

FIG. 1 shows a network 100 that comprises an embodiment of a reordering system. The network 100 comprises a mobile device 102, a server 104, and a data network 106. For the purpose of this description, it will be assumed that the data network 106 operates to provide communications between the server 104 and one or more portable devices using OFDM technology; however, embodiments of the reordering system are suitable for use with other transmission technologies as well.

In one embodiment, the server 104 operates to provide services that may be subscribed to by devices in communication with the network 106. The server 104 is coupled to the network 106 through the communication link 108. The communication link 108 comprises any suitable communication link, such as a wired and/or wireless link that operates to allow the server 104 to communicate with the network 106. The network 106 comprises any combination of wired and/or wireless networks that allows services to be delivered from the server 104 to devices in communication with the network 106, such as the device 102.

It should be noted that the network 106 may communicate with any number and/or types of portable devices within the scope of the embodiments. For example, other devices suitable for use in embodiments of the reordering system include, but are not limited to, a personal digital assistant (PDA), email device, pager, a notebook computer, mp3 player, video player, or a desktop computer. The wireless link 110 comprises a wireless communication link based on OFDM technology; however, in other embodiments the wireless link may comprise any suitable wireless technology that operates to allow devices to communicate with the network 106.

The device 102 in this embodiment comprises a mobile telephone that communicates with the network 106 through the wireless link 110. The device 102 takes part in an activation process that allows the device 102 to subscribe to receive services over the network 106. The activation process may be performed with the server 104; however, the activation process may also be performed with some other server, service provider, content retailer, or other network entity not shown. For the purpose of this description, it will be assumed that the device 102 performs the activation process with the server 104 and is now ready to subscribe and receive services from the server 104.

The server 104 comprises content that includes one or more real time services (RTS) 112, and/or one or more "other than real time services" (ORTS) 114. For example, the services (112, 114) comprise multimedia content that includes news, sports, weather, financial information, movies, and/or applications, programs, scripts, or any other type of suitable content or service. Thus, the services (112, 120) may comprise video, audio or other information formatted in any suitable format. The server 104 also comprises a multiplexer (MUX) 116 that operates to multiplex one or more of the services (112, 114) into a transmission frame 118 for transmission over the network 106 to the device 102, as shown by the path 120. During the generation of the transmission frame 118, data representing the services (112, 114) may be encoded, rate adjusted, interleaved, scrambled, or otherwise processed so as be transmitted in a bandwidth efficient manner that is resistant to transmission errors.

The device 102 receives the transmission frame 118 and performs basic physical layer processing to obtain slot data. In an embodiment, the device 102 comprises a reorder pipeline 122 that operates to receive the slot data and reverse the encoding processes performed at the transmitter. This operation will hereinafter be referred to as "reordering." For example, the reorder pipeline 122 operates on-the-fly using parallel processing to provide de-interleaving, descrambling, and/or any other process needed to reverse encoding processes performed at the transmitter. Since the reorder pipeline 122 reorders data on-the-fly using parallel processing, intermediate data storage is eliminated and process latencies are thereby minimized. Once the packets 124 are recovered, they are input to a decoder 126 that operates to decode the packets to obtain the transmitted services (112, 114). A more detailed description of the operation of the reorder pipeline 122 is provided in another section of this document.

Therefore, embodiments of a reordering system operate to efficiently reorder data on-the-fly using parallel processing to generate packets that can be decoded to recover one or more RTS and/or ORTS services. It should be noted that the reordering system is not limited to the implementations described with reference to FIG. 1, and that other implementations are possible within the scope of the embodiments.

FIG. 2 shows an embodiment of a frame 200 that illustrates OFDM data slots and slot allocation for a logical channel for use a reordering system. The frame 200 comprises "N" OFDM symbols each having seven (7) data slots. A slot allocation for a logic channel is shown generally by the shaded region at 202. Two variables are used to describe the slot allocation, namely; length and height. The length is in OFDM symbols and the height is in slots.

Figure 3:
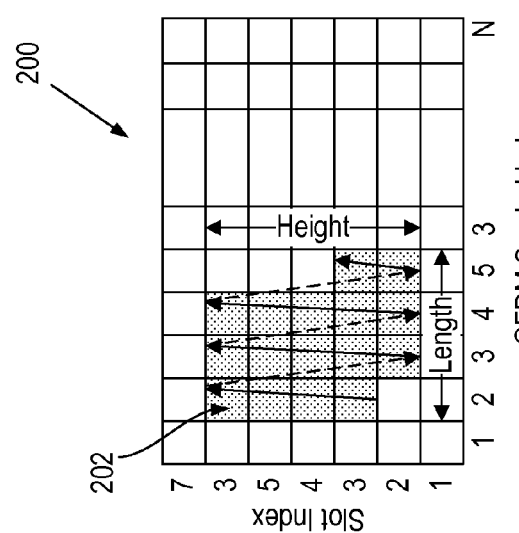
FIG. 3 shows an embodiment of a modulation table for use in a reordering system.

FIG. 3 shows an embodiment of a modulation table 300 for use in a reordering system. The modulation table comprises a mode indicator 302, a meaning descriptor 304, packet length indicator 306, slot per packet indicator 308, memory reset address indicator 310, and read start pointer 312. The modulation table 300 provides information relating to various data modes in which data may be formatted. As shown in the table 300, the data may be formatted in a quadrature phase shift keying (QPSK) or quadrature amplitude modulation (QAM) format. Each of the twelve modes 302 has an associated turbo packet length 306 and slot per turbo packet 308 allocations. The parameters in the table 300 are use by various portions of a reordering system to produce decodable packets. It should be noted that embodiments of the reordering system operate to satisfy the constraints of all twelve modes 302 on-the-fly to produce the decodable packets.

Figure 4:
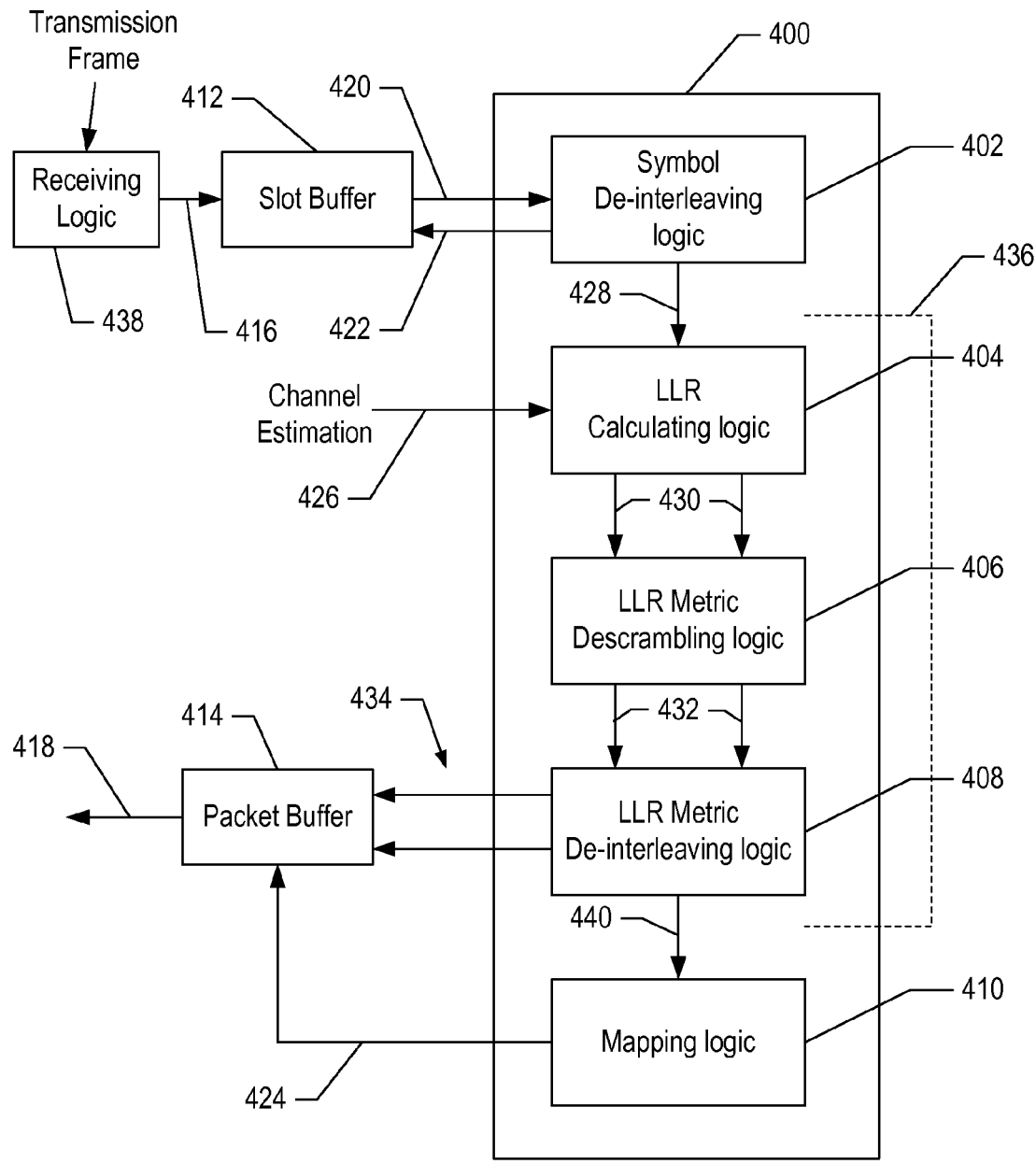
FIG. 4 shows an embodiment of a reorder pipeline for use in a reordering system.

FIG. 4 shows an embodiment of a reorder pipeline 400 for use in a reordering system. For example, the reorder pipeline 400 may be used as the reorder pipeline 122 shown in FIG. 1. The reorder pipeline 400 comprises symbol de-interleaving logic 402, log likelihood ratio (LLR) calculation logic 404, LLR metric descrambling logic 406, LLR metric de-interleaving logic 408, and mapping logic 410. It should be noted that the reorder pipeline 400 represents just one implementation and that other implementations are possible within the scope of the embodiments. For example, the functions of the reorder pipeline 400 may be implemented by one or more processors configured to execute a computer program.

It will be assumed for the purpose of this description that low level receiving logic 438 operates to receive transmission frames and store received interleaved modulation symbols 416 into a slot buffer 412. The slot buffer 412 may comprise any suitable memory or buffering logic.

In an embodiment, the symbol de-interleaving logic 402 comprises a CPU, processor, gate array, hardware logic, virtual machine, software, and/or any combination of hardware and software. The symbol de-interleaving logic 402 is configured to de-interleave the interleaved modulation symbols 416 stored in the slot buffer 412 on-the-fly by generating a slot buffer read address 422 according to the following procedure.

1. Initialize a variable $i_b$ to 0. Assume $i_b$ is a 9-bit counter in the range ($i_b \in \{0,511\}$).
2. Reverse the bits of $i_b$ and denote the resulting value as $i_{br}$. If $i_{br}$<500, assign $i_{br}$ to a slot read address (slot_addr) 422 and read the interleaved modulation symbols 416 out of the slot buffer 412 as shown at 420.
3. If $i_{br}$>500, increment $i_b$ by 1 and go to step 2.

As a result of the above operations, the interleaved modulation symbols 416 are read out of the slot buffer 412 every clock cycle for QPSK modes and every other clock cycle for QAM modes. This read-out process (as shown at 420) de-interleaves the interleaved modulation symbols 416 to produce a stream of modulation symbols 428 that are output from the symbol de-interleaving logic 402 and input to the LLR calculating logic 404.

In an embodiment, the LLR calculation logic 404 comprises a CPU, processor, gate array, hardware logic, virtual machine, software, and/or any combination of hardware and software. The LLR calculation logic 404 is configured to receive the stream of modulation symbols 428 and a channel estimation parameter 426 to generate parallel streams of scrambled LLR metrics 430 (6-bits each) in one clock cycle, depending on the data mode. For example, in QPSK modes, two scrambled LLR metrics will be generated in one clock cycle and four scrambled LLR metrics will be generated for 16QAM modes. From this point forward, the reordering pipeline 400 operates in a parallel configuration to process the parallel streams of scrambled LLR metrics in one clock cycle. For example, the LLR calculating logic 404 outputs the parallel streams of scrambled LLR metrics 430, which are input to the LLR-metric descrambling logic 406. The channel estimation parameter 426 may be provided by the receiving logic 438 and comprise any suitable parameters to estimate the transmission channel.

In an embodiment, LLR calculation logic 404 operates to calculate the LLR metrics of binary symbols from the received signals. The received signals are non-binary symbols corrupted by noise and interference. For example, assume that N binary symbols $b_1 b_2 \ldots b_N$ are grouped to form a single non-binary symbol S, which is then modulated onto a high-order constellation through Gray mapping. The modulated symbol is denoted as G(S) (with unitary averaged amplitude) and the corresponding received signal is r. The LLR of the binary symbol $b_N$ can be calculated as follows;

$$LLR_n = \ln(P(r \mid b_n = 0)) - \ln(P(r \mid b_n = 1)) \quad (1)$$
$$= \ln\left(\sum_{G(S):b_n=0} P(r \mid G(S))\right) - \ln\left(\sum_{G(S):b_n=1} P(r \mid G(S))\right)$$

The following channel model is assumed.

$$r = c \cdot G(s) + n \quad (2)$$

where c is the lumped (complex) channel gain and assumed to be known, and n is a white complex Gaussian noise process with zero mean and variance $N_0$.

In this case, equation (1) becomes;

$$LLR_n = \ln\left(\sum_{G(S):b_n=0} \exp\left(-\frac{|r - cG(S)|^2}{N_0}\right)\right) - \quad (3)$$

$$\ln\left(\sum_{G(S):b_n=1} \exp\left(-\frac{|r-cG(S)|^2}{N_0}\right)\right)$$

In implementing the above calculation, all values of $|r-cG(S_k)|^2/N_0$ for all constellation points $S_k$'s are first calculated, the max*(.,.) [1], defined by;

$$\max{}^*(x,y)=\ln(\exp(x)+\exp(y))=\max(x,y)+\ln(1+\exp(-|x-y|)) \quad (4)$$

is then used to get LLR, for different bit position n's. When;

$$|x-y|>>0, \ln(1+\exp(-|x-y|))\approx 0, \text{ and } \max{}^*(x,y)\approx\max(x,y).$$

Therefore;

$$\ln\sum_j \exp(a_j) \approx \max_j a_j \quad (5)$$

Applying equation (5) to equation (3) yields the following "dual-max" approximation;

$$LLR_n = \min_{G(S):b_n=1} \frac{|r-cG(S)|^2}{N_0} - \min_{G(S):b_n=0} \frac{|r-cG(S)|^2}{N_0}$$

In an embodiment, the LLR metric descrambling logic 406 comprises a CPU, processor, gate array, hardware logic, virtual machine, software, and/or any combination of hardware and software. The LLR metric descrambling logic 406 is configured to reverse a descrambling process performed at the source transmitter. For example, the transmitter uses a 20th order pseudorandom noise (PN) sequence generator to perform bit scrambling. The same PN sequence is used by the LLR metric descrambling logic 406 to descramble the parallel streams of scrambled LLR metrics 430 to produce parallel streams of interleaved LLR metrics 432, which are input to the LLR metric de-interleaving logic 408.

Figure 5:
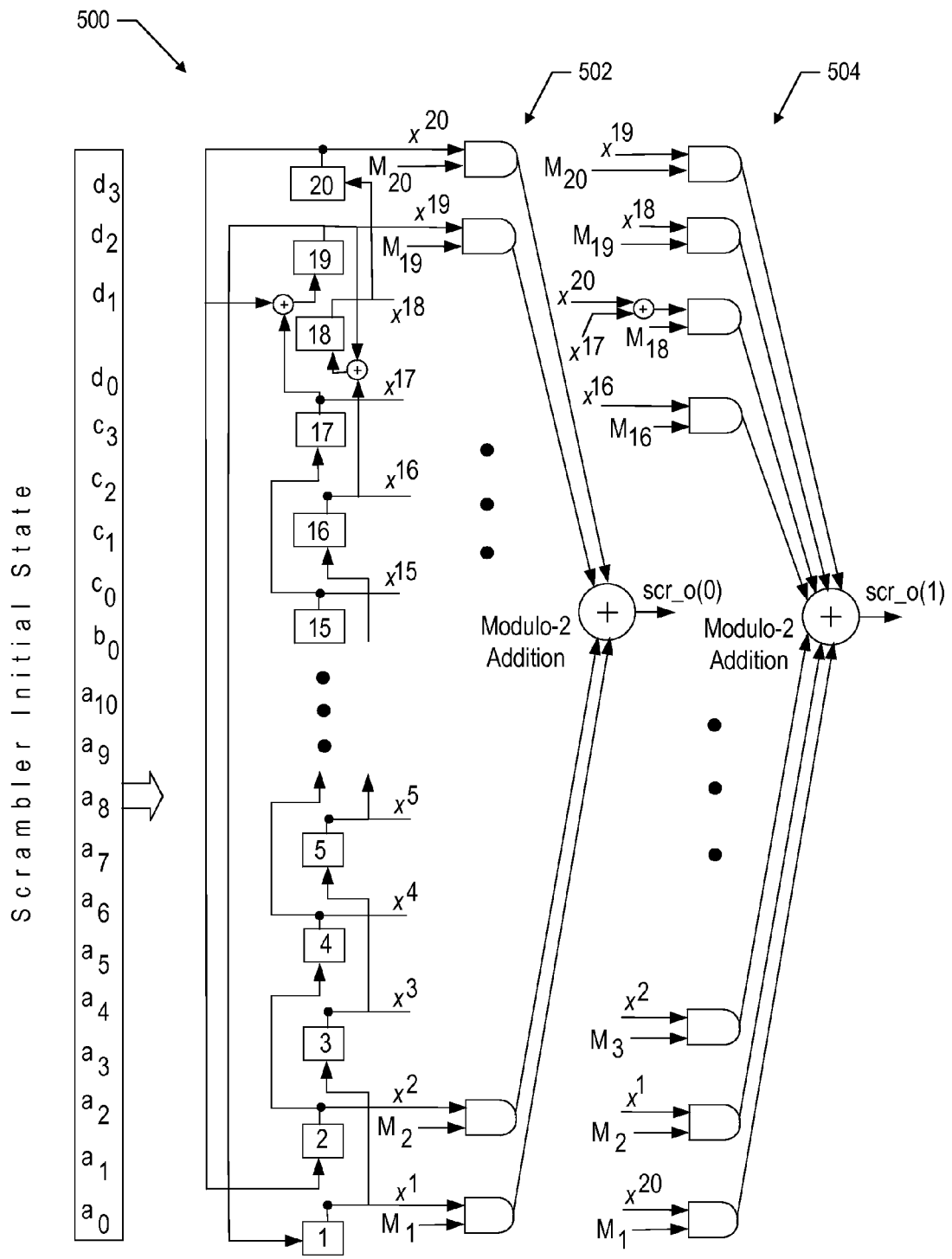
FIG. 5 shows an embodiment of a PN sequence generator for use in a reordering system.

FIG. 5 shows an embodiment of a PN sequence generator 500 for use in a reordering system. For example, the generator 500 is suitable for use by the LLR metric descrambling logic 406 to generate PN sequences to reverse a scrambling process performed at a source transmitter. The generator 500 outputs two sequences. One sequence is output by generator portion 502 and another sequence is output by generator portion 504. Each of the parallel streams of scrambled LLR metrics 430 will be inverted if the corresponding descrambling bit sequence is a '1'; otherwise, the data will pass through. The generator portions 502, 504 comprise 20-tap linear feedback shift registers (LFSR) that produce a descrambling bit sequence corresponding to $h(D)=D20+D17+1$. Because the QPSK modes can generate two scrambled LLR metrics and the 16QAM modes can generate four scrambled LLR metrics in one clock cycle, the descrambling is performed in parallel to reduce latency.

Referring again to FIG. 4, the LLR metric de-interleaving logic 408 comprises a CPU, processor, gate array, hardware logic, virtual machine, software, and/or any combination of hardware and software. During operation, the LLR metric de-interleaving logic 408 receives the parallel streams of interleaved LLR metrics 432 and generates parallel streams of LLR metrics 434. De-interleaving of the parallel streams of interleaved LLR metrics 432 is achieved by hopping addresses when writing the parallel streams of interleaved LLR metrics 432 to the packet buffer 414. In an embodiment, the LLR metric de-interleaving logic 408 comprises a state machine and a counter that are used to generate the addresses with which to de-interleave the parallel streams of interleaved LLR metrics 432. It should be noted that the blocks 404, 406, and 408 may be referred to as metric processing logic as shown by 436.

Figure 6:
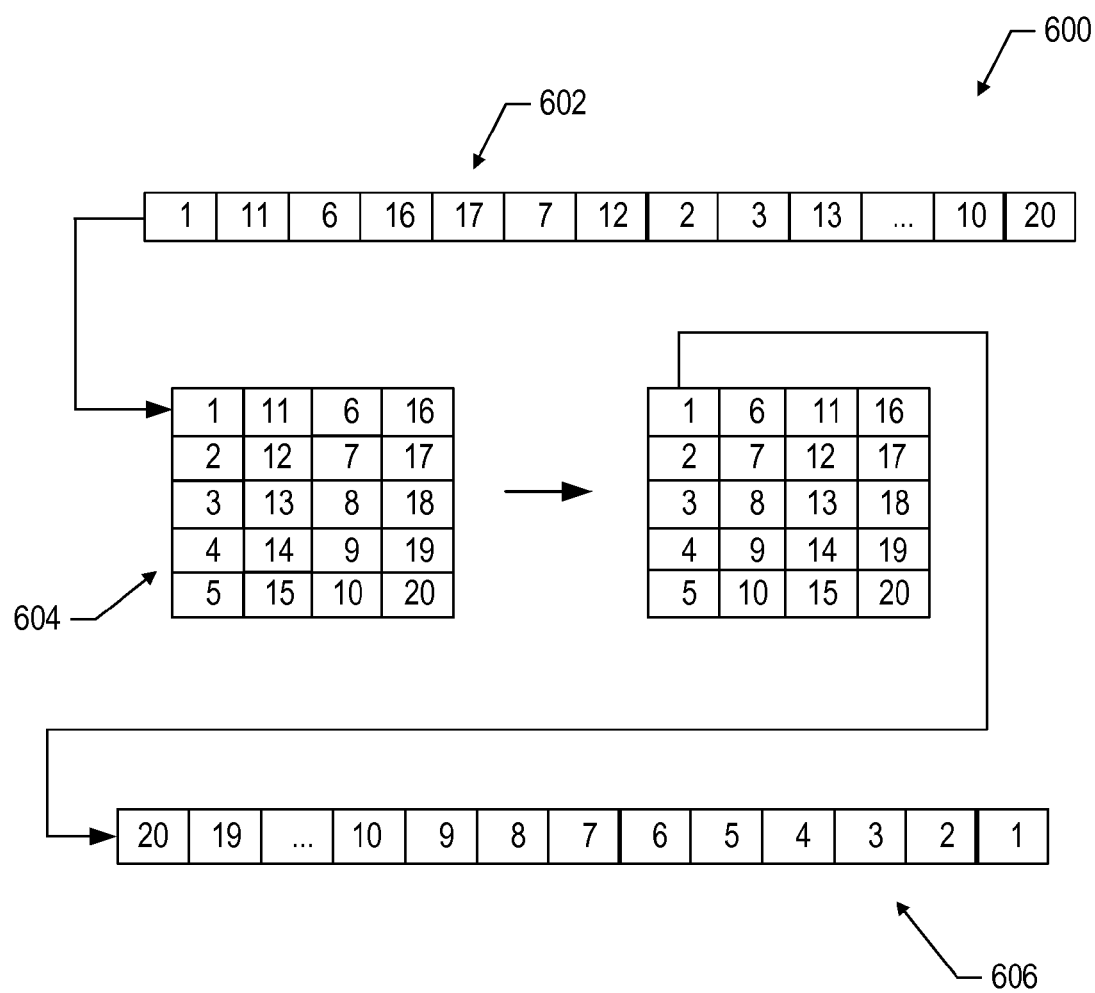
FIG. 6 shows an embodiment of de-interleaving table logic for use in a reordering system.

FIG. 6 shows one embodiment of de-interleaving table logic 600 suitable for use in a reordering system. For example, the LLR metric de-interleaving logic 408 comprises the table logic 600, a state machine and a counter to generate the addresses with which to write a stream of interleaved LLR metrics 602 into de-interleaving tables 604, and read a stream de-interleaved LLR metrics 606 out of the de-interleaving tables 604. The LLR metric de-interleaving logic 408 may comprise multiple versions of the table logic 600 so that parallel streams of interleaved LLR metrics can be de-interleaved.

Referring again to FIG. 4, in an embodiment, the mapping logic 410 comprises a CPU, processor, gate array, hardware logic, virtual machine, software, and/or any combination of hardware and software. The mapping logic 410 operates to provide read/write control signals 424 to map how the parallel stream of LLR metrics 434 are written into the packet buffer 414 so that decodable turbo packets 418 can be read out of the packet buffer 414. In an embodiment, the mapping logic 410 receives status inputs 440 that indicate status of the slot buffer 412 and other elements of the pipeline 400. A more detailed description of the operation of the packet buffer 414 is provided with reference to the description of FIG. 7.

Figure 7:
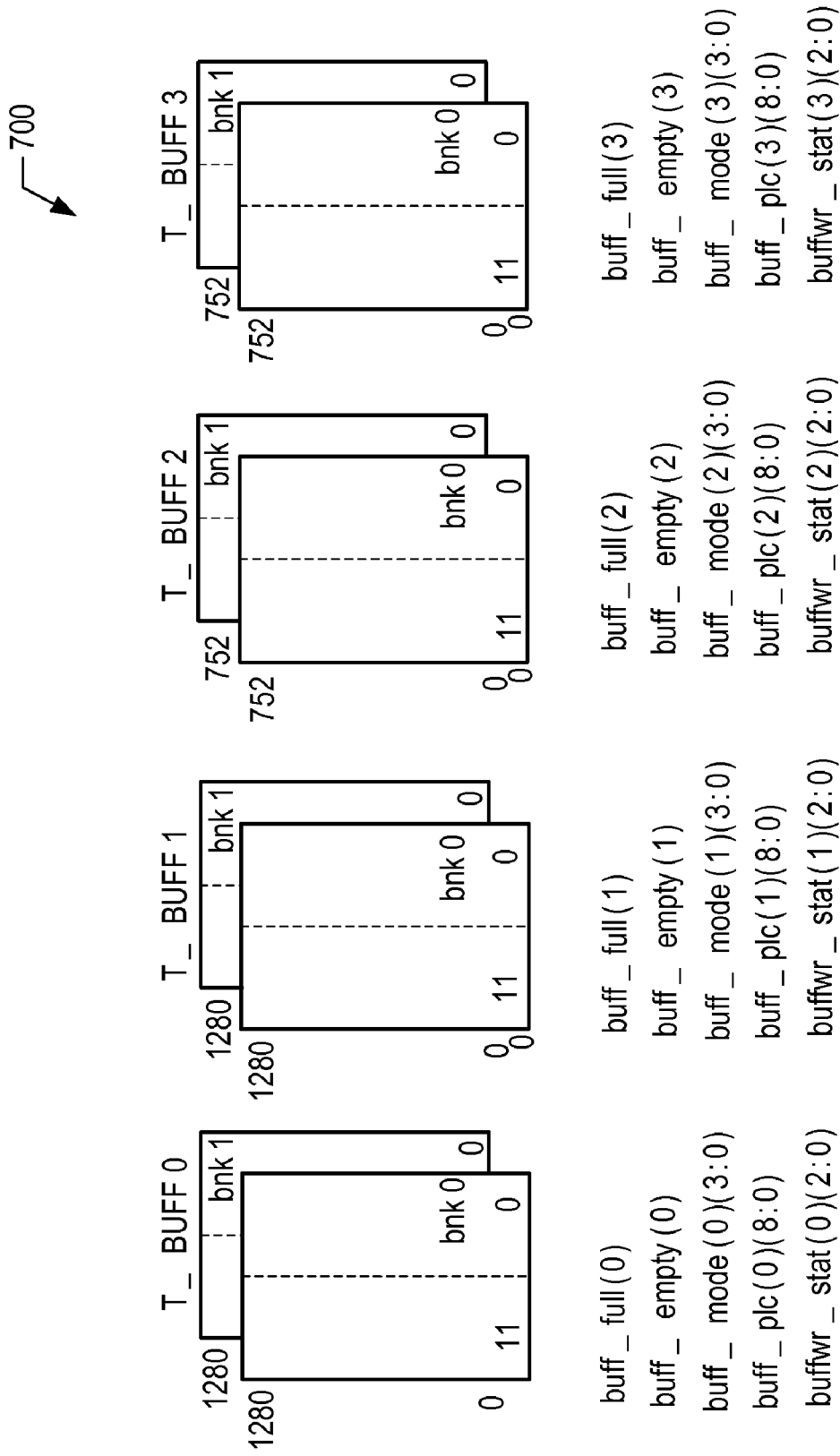
FIG. 7 shows an embodiment of a packet buffer for use in a reordering system.

FIG. 7 shows an embodiment of a packet buffer 700 for use in a reordering system. For example, the packet buffer 700 is suitable for use as the packet buffer 414 shown in FIG. 4. For clarity, the operation of the packet buffer 700 will be described with reference to the mapping logic 410 shown in FIG. 4.

The packet buffer 700 comprises four buffers referred to as T_BUFF0, T_BUFF1, T_BUFF2, and T_BUFF3. The four buffers have multiple banks and associated status conditions. The status conditions are as follows.

1. buff full( ) indicates when a buffer is full
2. buff empty( ) indicates when a buffer is empty
3. buff mode( ) indicates a buffer mode
4. buff plc( ) indicates an MLC identifier of a turbo packet in memory.
5. buffwr_stat( ) indicates a buffer's write status In an embodiment, reading, writing and status conditions are provided using the control signals 424. The mapping logic 410 operates to provide the mapping process by choosing a selected T_BUFF to write the parallel stream of LLR metrics 434 in to, and another T_BUFF to readout decodable packets 418. In an embodiment, the mapping logic 410 comprises a polling algorithm to poll all the T_BUFFs to control the write and read operations to output the decodable packets 418.

During operation, the parallel streams of LLR metrics 434 are alternatively written to the T_BUFF banks (i.e., bank0 and bank1). The mapping logic 410 comprises one T_BUFF memory write address counter (tbufwr_cnt[9:0]). This counter is one-fourth of the turbo packet length and will increase every other clock cycle. The write sequence is bank0, bank1, bank1, bank0, bank0, bank1, bank1, bank0, bank0, etc.

The mapping logic 410 also comprises four 11-bit registers, corresponding to the four different T_BUFF memories, which are used to store the counter value for each memory write. The registers are used because a slot may contain only a partial turbo packet. At the beginning of a slot processing operation, the tbufwr_cnt[9:0] will be loaded with the corresponding register value and will increase thereafter.

The turbo packet size of the OIS data is large, but the rate is low (i.e., QPSK ⅕). In an embodiment, only the first two T_BUFF memories are used for OIS turbo packets. For example, the read and write polling occurs between the two T_BUFF memories, T_BUFF0 and T_BUFF1.

It should be noted that the mapping logic 410 and packet buffer 414 may comprise any suitable hardware and/or software. One implementation can be found in U.S. patent application Ser. No. 11/398,156 cross-referenced above.

Referring again to FIG. 4, in an embodiment, the reordering system comprises a computer program having one or more program instructions ("instructions") stored on a computer-readable medium, which when executed by at least one processor, for instance, a processor at the reorder pipeline 400, provides the functions of the reordering system described herein. For example, instructions may be loaded into the reorder pipeline 400 from a computer-readable media, such as a floppy disk, CDROM, memory card, FLASH memory device, RAM, ROM, or any other type of memory device or computer-readable medium that interfaces to the reorder pipeline 400. In another embodiment, the instructions may be downloaded into the reorder pipeline 400 from an external device or network resource that interfaces to the reorder pipeline 400. The instructions, when executed by the processing logic operate to provide embodiments of a reordering system as described herein.

Thus, the reorder pipeline 400 operates to provide an embodiment of a reordering system to efficiently reorder slot data on-the-fly in a parallel process to produce decodable packets in a way that eliminates intermediate memories and minimizes processing latencies.

Figure 8:
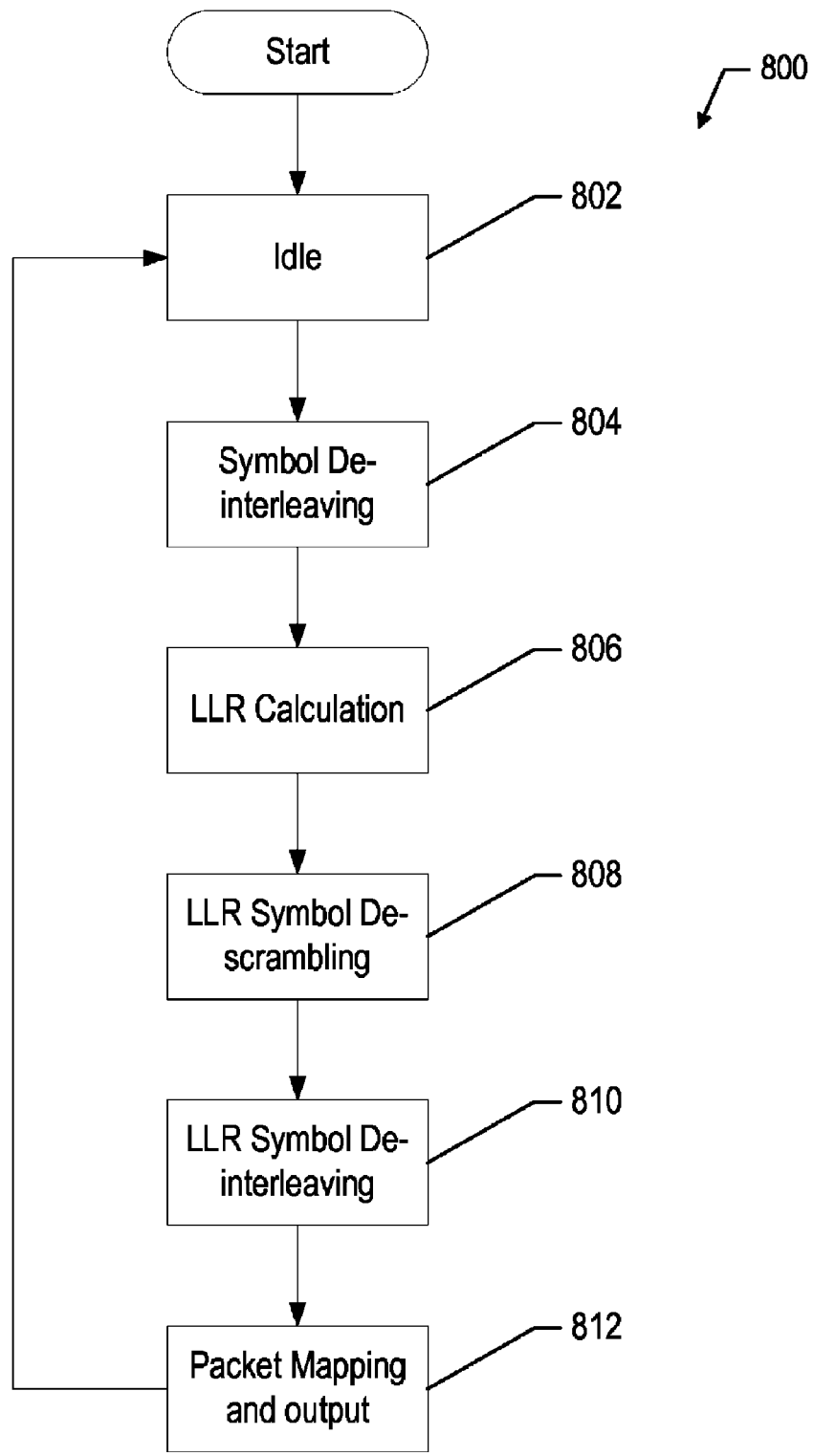
FIG. 8 shows an embodiment of a method for operating a reorder pipeline for use in a reordering system.

FIG. 8 shows an embodiment of a method 800 for operating a reorder pipeline for use in a reordering system. For example, the reorder pipeline 300 operates to provide the functions of the method 800 as describe below.

At block 802, an idle state is entered to wait for valid slot data. For example, the symbol de-interleaving logic 402 waits for interleaved modulation symbols 416 to become available in the slot buffer 412. For example, receiving logic 438 operates to receive a transmission frame comprising interleaved modulation symbols that are stored in the slot buffer 412.

At block 804, symbol de-interleaving is performed. For example, the symbol de-interleaving logic 402 operates to de-interleave the interleaved modulation symbols 416 to produce the stream of modulation symbols 428.

At block 806, an LLR calculation is performed. For example, the LLR calculating logic 404 operates to provide LLR calculations so that the stream of modulation symbols 428 can be used to produce the parallel streams of scrambled LLR metrics 430.

At block 808, an LLR descrambling is performed. For example, the LLR metric descrambling logic 406 operates to provide descrambling so that the parallel streams of scrambled LLR metrics 430 can be descrambled to produce the parallel streams of interleaved LLR metrics 432.

At block 810, an LLR de-interleaving is performed. For example, the LLR metric de-interleaving logic 408 operates to provide de-interleaving so that the parallel streams of interleaved LLR metrics 432 can be processed to produce the parallel streams of LLR metrics 434.

At block 812, packet mapping and packet output is performed. For example, the mapping logic 410 operates to control the write and read operations of the packet buffer 414 using the control signals 424. The mapping logic 410 operates to provide write control to control how the parallel streams of LLR metrics 434 are written into the packet buffer 414. The mapping logic 410 also operates to provide read control to control how stored LLR metrics are read out of the packet buffer 414 to produce decodable turbo packets 418. For example, the mapping logic 410 operates to control the packet buffer 414 as described with reference to FIG. 7.

Thus, the reordering system provides dynamic packet reordering for use in receiving devices. It should be noted that the method 800 represents just one implementation and the changes, additions, deletions, combinations or other modifications of the method 800 are possible within the scope of the embodiments. In the method 800, only two groups of memories are utilized for performing symbol de-interleaving, LLR calculation, LLR metric descrambling, LLR metric de-interleaving, and turbo packet mapping on-the-fly using a parallel processing technique. As a result, process latencies and buffer requirements are minimized. It should also be noted that the reordering system described herein has no limitation at to the maximum number of MLCs that can be handled within one OFDM symbol.

Figure 9:
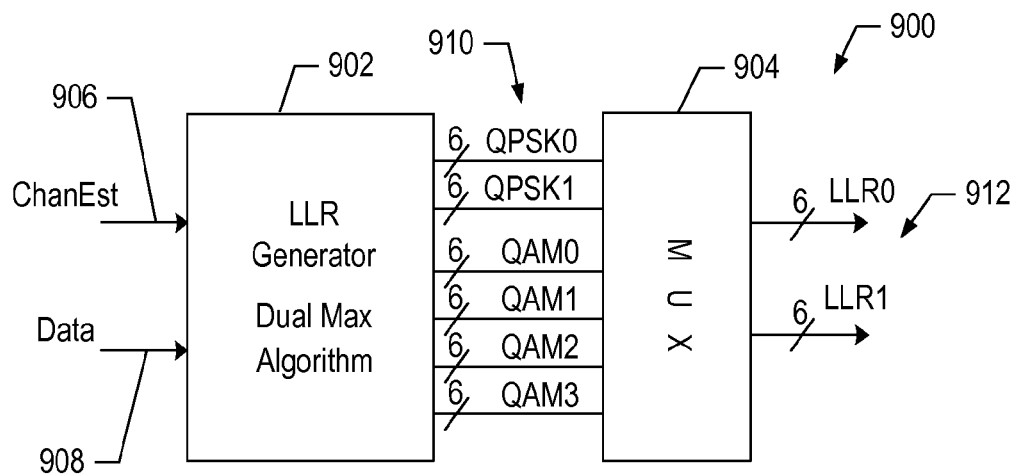
FIG. 9 shows an embodiment of LLR calculation logic for use in a reordering system.

FIG. 9 shows an embodiment of LLR calculating logic 900. For example, the LLR calculating logic 900 is suitable for use as the LLR calculating logic 404 shown in FIG. 4. The LLR calculating logic 900 comprises LLR generator 902 and a multiplexer 904. The generator 902 and multiplexer 904 comprises any suitable processor, CPU, gate array, hardware, and/or software. The generator 902 is configured to receive a channel estimation parameter 906 and modulation symbol data 908. The generator 902 operates to perform an algorithm to produce QPSK and QAM signals shown generally at 910. For example, the generator 902 calculates LLR metrics to produce the QPSK and QAM signals. The multiplexer 904 is configured to receive the signals shown at 910 and produce parallel streams of metrics shown generally at 912. It should be noted the LLR calculating logic 900 represents just one implementation and that other implementations are possible within the scope of the embodiments.

Figure 10:
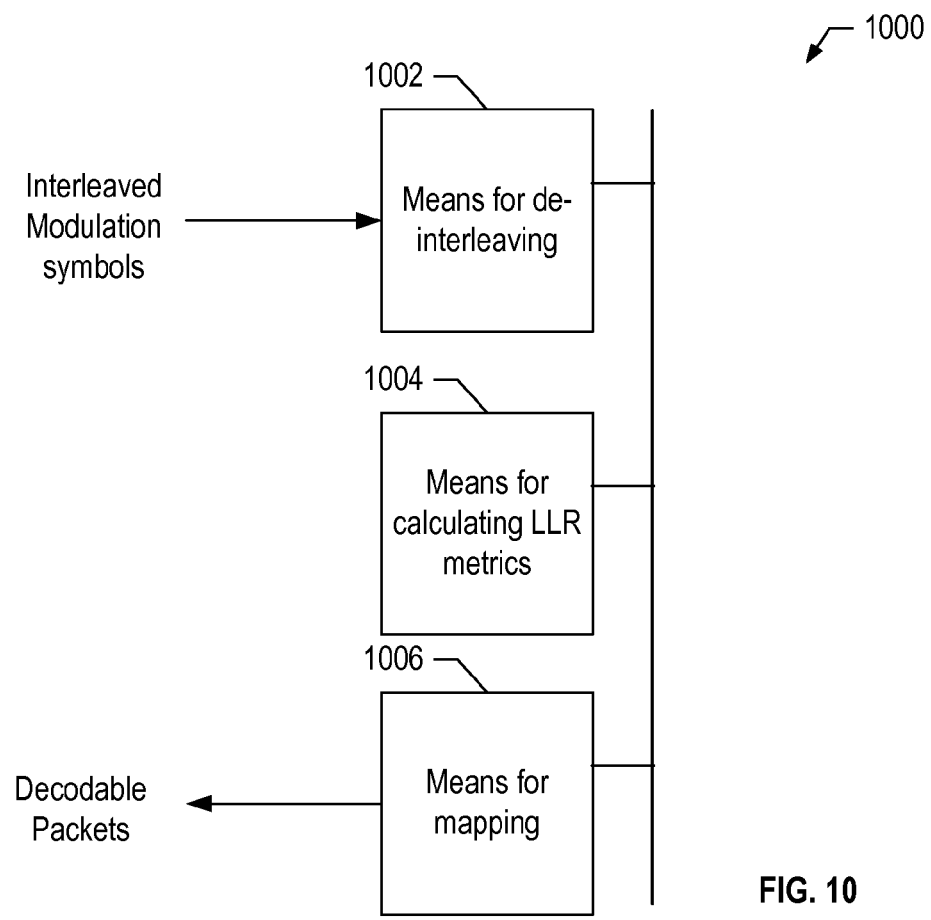
FIG. 10 shows an embodiment of a reordering system.

FIG. 10 shows an embodiment of a reordering system 1000. The reordering system 1000 comprises means (1002) for de-interleaving a stream of the interleaved modulation symbols, means (1004), for calculating parallel streams of LLR metrics, and means (1006) for mapping parallel streams of LLR metrics to produce a stream of decodable packets. In an embodiment, the means 1002, 1004, and 1006 comprise one or more processors configured to execute program instructions to provide embodiments of a reordering system as described herein.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a reordering system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for processing slot data on-the-fly to produce decodable packets, wherein the slot data comprises interleaved modulation symbols, the method comprising:
   de-interleaving a stream of the interleaved modulation symbols to produce a stream of modulation symbols;
   calculating parallel streams of LLR metrics based on the stream of modulation symbols;
   generating control signals to map the parallel streams of LLR metrics into a packet buffer; and
   producing a stream of decodable packets from the packet buffer based on the parallel streams of LLR metrics and the control signals.

2. The method of claim 1, wherein said calculating comprises:
   calculating parallel streams of scrambled LLR metrics based on the stream of modulation symbols;
   descrambling the parallel streams of scrambled LLR metrics to produce parallel streams of interleaved LLR metrics; and
   de-interleaving the parallel streams of interleaved LLR metrics to produce the parallel streams of LLR metrics.

3. The method of claim 2, wherein calculating the parallel streams of scrambled LLR metrics comprises using a channel estimation parameter.

4. The method of claim 2, wherein descrambling the parallel streams of scrambled LLR metrics comprises using a pseudorandom sequence.

5. The method of claim 2, wherein de-interleaving the parallel streams of interleaved LLR metrics comprises using a de-interleaving table.

6. The method of claim 2, wherein de-interleaving the parallel streams of interleaved LLR metrics is achieved by hopping addresses.

7. The method of claim 2, wherein calculating the parallel streams of scrambled LLR metrics and descrambling the parallel streams of scrambled LLR metrics are performed within one clock cycle.

8. The method of claim 2, wherein calculating the parallel streams of scrambled LLR metrics is performed according to a dual max approximation.

9. The method of claim 8, wherein the dual max approximation is based on the following equation:

$$LLR_n = \min_{G(S):b_n=1} \frac{|r - cG(S)|^2}{N_0} - \min_{G(S):b_n=0} \frac{|r - cG(S)|^2}{N_0}$$

where $LLR_n$ is a log likelihood ratio (LLR) for a bit position n; $b_n$ is a binary symbol at bit position n; S is a non-binary symbol grouped from N binary symbols $b_1$ $b_2 \ldots b_N$; G(S) is a modulated symbol representing a modulation of the non-binary symbol S onto a higher-order constellation through Gray mapping; r is a received signal; c is a lumped channel gain; and $N_0$ is a variance of a white complex Gaussian noise process.

10. The method of claim 1, further comprising receiving the interleaved modulation symbols in an OFDM transmission frame.

11. The method of claim 1, wherein the packet buffer comprises a plurality of buffers, and wherein said control signals map the parallel streams of LLR metrics by polling the plurality of buffers to control write and read operations to produce the stream of decodable packets.

12. The method of claim 11, further comprising providing the parallel streams of LLR metrics to the plurality of buffers in an alternating manner.

13. The method of claim 12, wherein providing the parallel streams of LLR metrics to the plurality of buffers in an alternating manner is based on a counter value that increases every other clock cycle.

14. Apparatus for processing slot data on-the-fly to produce decodable packets, wherein the slot data comprises interleaved modulation symbols, the apparatus comprising:
   de-interleaving hardware logic configured to de-interleave a stream of the interleaved modulation symbols to produce a stream of modulation symbols;
   metric processing logic configured to produce parallel streams of LLR metrics based on the stream of modulation symbols;
   mapping logic configured to generate control signals to map the parallel streams of LLR metrics into a packet buffer; and
   output logic configured to produce a stream of decodable packets from the packet buffer based on the parallel streams of LLR metrics and the control signals.

15. The apparatus of claim 14, wherein said metric processing logic comprises:
   calculation logic configured to calculate parallel streams of scrambled LLR metrics based on the stream of modulation symbols;
   descrambling logic configured to descramble the streams of scrambled LLR metrics to produce parallel streams of interleaved LLR metrics; and
   de-interleaving logic configured to de-interleave the parallel streams of interleaved LLR metrics to produce the parallel streams of LLR metrics.

16. The apparatus of claim 15, wherein said calculating logic is configured to calculate the parallel streams of scrambled LLR metrics using a channel estimation parameter.

17. The apparatus of claim 15, wherein said descrambling logic is configured to descramble the parallel streams of scrambled LLR metrics using a pseudorandom sequence.

18. The apparatus of claim 15, wherein said de-interleaving logic is configured to de-interleave the parallel streams of interleaved LLR metrics using a de-interleaving table.

19. The apparatus of claim 15, wherein the de-interleaving logic is configured to de-interleave the parallel streams of interleaved LLR metrics by hopping addresses.

20. The apparatus of claim 15, wherein the calculation logic is configured to calculate the parallel streams of scrambled LLR metrics and the descrambling logic is configured to descramble the parallel streams of scrambled LLR metrics within one clock cycle.

21. The apparatus of claim 15, wherein the calculation logic is configured to calculate the parallel streams of scrambled LLR metrics according to a dual max approximation.

22. The apparatus of claim 21, wherein the dual max approximation is based on the following equation:

$$LLR_n = \min_{G(S):b_n=1} \frac{|r - cG(S)|^2}{N_0} - \min_{G(S):b_n=0} \frac{|r - cG(S)|^2}{N_0}$$

where $LLR_n$ is a log likelihood ratio (LLR) for a bit position n; $b_n$ is a binary symbol at bit position n; S is a non-binary symbol grouped from N binary symbols $b_1$ $b_2 \ldots b_N$; G(S) is a modulated symbol representing a modulation of the non-binary symbol S onto a higher-order constellation through Gray mapping; r is a received signal; c is a lumped channel gain; and $N_0$ is a variance of a white complex Gaussian noise process.

23. The apparatus of claim 14, further comprising receiving logic configured to receive the interleaved modulation symbols in an OFDM transmission frame.

24. The apparatus of claim 14, wherein the packet buffer comprises a plurality of buffers, and wherein said control signals map the parallel streams of LLR metrics by polling the plurality of buffers to control write and read operations to produce the stream of decodable packets.

25. The apparatus of claim 24, wherein the metric processing logic is further configured to provide the parallel streams of LLR metrics to the plurality of buffers in an alternating manner.

26. The apparatus of claim 25, wherein the metric processing logic is further configured to provide the parallel streams of LLR metrics to the plurality of buffers in an alternating manner based on a counter value that increases every other clock cycle.

27. Apparatus for processing slot data on-the-fly to produce decodable packets, wherein the slot data comprises interleaved modulation symbols, the apparatus comprising:
means for de-interleaving a stream of the interleaved modulation symbols to produce a stream of modulation symbols;
means for calculating parallel streams of LLR metrics based on the stream of modulation symbols; means for generating control signals to map the parallel streams of LLR metrics into a packet buffer; and
means for producing a stream of decodable packets from the packet buffer based on the parallel streams of LLR metrics and the control signals.

28. The apparatus of claim 27, wherein said means for calculating comprises:
means for calculating parallel streams of scrambled LLR metrics based on the stream of modulation symbols;
means for descrambling the parallel streams of scrambled LLR metrics to produce parallel streams of interleaved LLR metrics; and
means for de-interleaving the parallel streams of interleaved LLR metrics to produce the parallel streams of LLR metrics.

29. The apparatus of claim 28, wherein said means for calculating the parallel streams of scrambled LLR metrics comprises using a channel estimation parameter.

30. The apparatus of claim 28, wherein said means for descrambling the parallel streams of scrambled LLR metrics comprises using a pseudorandom sequence.

31. The apparatus of claim 28, wherein said means for de-interleaving the parallel streams of interleaved LLR metrics comprises using a de-interleaving table.

32. The apparatus of claim 28, wherein the means for de-interleaving the parallel streams of interleaved LLR metrics is performed by hopping addresses.

33. The apparatus of claim 28, further comprising means for calculating the parallel streams of scrambled LLR metrics and descrambling the parallel streams of scrambled LLR metrics within one clock cycle.

34. The apparatus of claim 28, wherein the means for calculating the parallel streams of scrambled LLR metrics is based on a dual max approximation.

35. The apparatus of claim 34, wherein the dual max approximation is based on the following equation:

$$LLR_n = \min_{G(S):b_n=1} \frac{|r - cG(S)|^2}{N_0} - \min_{G(S):b_n=0} \frac{|r - cG(S)|^2}{N_0}$$

where $LLR_n$ is a log likelihood ratio (LLR) for a bit position n; $b_n$ is a binary symbol at bit position n; S is a non-binary symbol grouped from N binary symbols $b_1$ $b_2 \ldots b_N$; G(S) is a modulated symbol representing a modulation of the non-binary symbol S onto a higher-order constellation through Gray mapping; r is a received signal; c is a lumped channel gain; and $N_0$ is a variance of a white complex Gaussian noise process.

36. The apparatus of claim 27, further comprising means for receiving the interleaved modulation symbols in an OFDM transmission frame.

37. The apparatus of claim 27, wherein the packet buffer comprises a plurality of buffers, and wherein said control signals map the parallel streams of LLR metrics by polling the plurality of buffers to control write and read operations to produce the stream of decodable packets.

38. The apparatus of claim 37, further comprising means for providing the parallel streams of LLR metrics to the plurality of buffers in an alternating manner.

39. The apparatus of claim 38, wherein the means for providing the parallel streams of LLR metrics to the plurality of buffers in an alternating manner is based on a counter value that increases every other clock cycle.

40. A non-transitory computer-readable storage medium comprising a computer program, which when executed by at least one processor, operates to process slot data on-the-fly to produce decodable packets, wherein the slot data comprises interleaved modulation symbols, the computer program comprising:
   instructions for de-interleaving a stream of the interleaved modulation symbols to produce a stream of modulation symbols;
   instructions for calculating parallel streams of LLR metrics based on the stream of modulation symbols;
   instructions for generating control signals to map the parallel streams of LLR metrics into a packet buffer; and
   instructions for producing a stream of decodable packets from the packet buffer based on the parallel streams of LLR metrics and the control signals.

41. The non-transitory computer-readable storage medium of claim 40, wherein said instructions for calculating comprises:
   instructions for calculating parallel streams of scrambled LLR metrics based on the stream of modulation symbols;
   instructions for descrambling the parallel streams of scrambled LLR metrics to produce parallel streams of interleaved LLR metrics; and
   instructions for de-interleaving the parallel streams of interleaved LLR metrics to produce the parallel streams of LLR metrics.

42. The non-transitory computer-readable storage medium of claim 41, wherein said instructions for calculating the parallel streams of scrambled LLR metrics comprises using channel estimation parameter.

43. The non-transitory computer-readable storage medium of claim 41, wherein said instructions for descrambling the parallel streams of scrambled LLR metrics comprises using a pseudorandom sequence.

44. The non-transitory computer-readable storage medium of claim 41, wherein said instructions for de-interleaving the parallel streams of interleaved LLR metrics comprises using a de-interleaving table.

45. The non-transitory computer-readable storage medium of claim 41, wherein the instructions for de-interleaving the parallel streams of interleaved LLR metrics comprise instructions for de-interleaving the parallel streams of interleaved LLR metrics by hopping addresses.

46. The non-transitory computer-readable storage medium of claim 41, wherein the computer program further comprises instructions for calculating the parallel streams of scrambled LLR metrics and descrambling the parallel streams of scrambled LLR metrics within one clock cycle.

47. The non-transitory computer-readable storage medium of claim 41, wherein the instructions for calculating the parallel streams of scrambled LLR metrics comprise instructions for calculating the parallel streams of scrambled LLR metrics according to a dual max approximation.

48. The non-transitory computer-readable storage medium of claim 47, wherein the dual max approximation is based on the following equation:

$$LLR_n = \min_{G(S):b_n=1} \frac{|r - cG(S)|^2}{N_0} - \min_{G(S):b_n=0} \frac{|r - cG(S)|^2}{N_0}$$

where $LLR_n$ is a log likelihood ratio (LLR) for a bit position n; $b_n$ is a binary symbol at bit position n; S is a non-binary symbol grouped from N binary symbols $b_1$ $b_2 \ldots b_N$; G(S) is a modulated symbol representing a modulation of the non-binary symbol S onto a higher-order constellation through Gray mapping; r is a received signal; c is a lumped channel gain; and $N_0$ is a variance of a white complex Gaussian noise.

49. The non-transitory computer-readable storage medium of claim 40, wherein the computer program further comprises instructions for receiving the interleaved modulation symbols in an OFDM transmission frame.

50. The non-transitory computer-readable storage medium of claim 40, wherein the packet buffer comprises a plurality of buffers, and wherein said control signals map the parallel streams of LLR metrics by polling the plurality of buffers to control write and read operations to produce the stream of decodable packets.

51. The non-transitory computer-readable storage medium of claim 50, wherein the computer program further comprises instructions for providing the parallel streams of LLR metrics to the plurality of buffers in an alternating manner.

52. The non-transitory computer-readable storage medium of claim 51, wherein the instructions for providing the parallel streams of LLR metrics comprise instructions for providing the parallel streams of LLR metrics to the plurality of buffers in an alternating manner based on a counter value that increases every other clock cycle.

53. A processor configured to process slot data on-the-fly to produce decodable packets, wherein the slot data comprises interleaved modulation symbols, the processor comprising:
   a first hardware module for de-interleaving a stream of the interleaved modulation symbols to produce a stream of modulation symbols;
   a second module for calculating parallel streams of LLR metrics based on the stream of modulation symbols;
   a third module for generating control signals to map the parallel streams of LLR metrics into a packet buffer; and
   a fourth module for producing a stream of decodable packets from the packet buffer based on the parallel streams of LLR metrics and the control signals.

54. The processor of claim 53, wherein said second module comprises:
   a fifth module for calculating parallel streams of scrambled LLR metrics based on the stream of modulation symbols;
   a sixth module for descrambling the parallel streams of scrambled LLR metrics to produce parallel streams of interleaved LLR metrics; and
   a seventh module for de-interleaving the parallel streams of interleaved LLR metrics to produce the parallel streams of LLR metrics.

55. The processor of claim 54, where said fifth module calculates the parallel streams of scrambled LLR metrics using a channel estimation parameter.

56. The processor of claim 54, where said sixth module descrambles the parallel streams of scrambled LLR metrics using a pseudorandom sequence.

57. The processor of claim 54, further comprising where said seventh module de-interleaves the parallel streams of interleaved LLR metrics using a de-interleaving table.

58. The processor of claim 53, further comprising a fifth module for receiving the interleaved modulation symbols in an OFDM transmission frame.

* * * * *